(12) United States Patent
Andreessen et al.

(10) Patent No.: US 7,984,421 B2
(45) Date of Patent: Jul. 19, 2011

(54) WEB APPLICATION CLONING

(75) Inventors: Marc L. Andreessen, Palo Alto, CA (US); Steven Vassallo, Redwood City, CA (US); Diego Doval, Mountain View, CA (US)

(73) Assignee: Ning, Inc., Mountain View, CA (US)

( * ) Notice: Subject to any disclaimer, the term of this patent is extended or adjusted under 35 U.S.C. 154(b) by 1152 days.

(21) Appl. No.: 11/621,056

(22) Filed: Jan. 8, 2007

(65) Prior Publication Data

US 2008/0082955 A1    Apr. 3, 2008

Related U.S. Application Data

(60) Provisional application No. 60/828,062, filed on Oct. 3, 2006.

(51) Int. Cl.
*G06F 9/44* (2006.01)
(52) U.S. Cl. ........ 717/109; 717/106; 717/113; 717/136; 717/137; 717/139
(58) Field of Classification Search .............. 717/109
See application file for complete search history.

(56) References Cited

U.S. PATENT DOCUMENTS

| | | | | |
|---|---|---|---|---|
| 2002/0078057 A1* | 6/2002 | Wang et al. | | 707/100 |
| 2003/0023445 A1* | 1/2003 | Trifon | | 717/171 |
| 2006/0274767 A1* | 12/2006 | Dessau | | 370/401 |
| 2007/0106650 A1 | 5/2007 | Moore | | |
| 2008/0071883 A1* | 3/2008 | Alterman | | 717/106 |
| 2008/0147672 A1 | 6/2008 | Pena et al. | | |

OTHER PUBLICATIONS

"Offline Downloader" User's Guide, http://www.softwarea.com/offline-browser/index.htm, Copyright: InternetSoft Corporation, 2000 - 2006.*
Di Lucca et al. "An approach to identify duplicated web pages" Computer Software and Applications Conference, 2002. Proceedinds. 26th Annual International, 2002, pp. 481-486.*
Lanubile et al. "Finding function clones in Web applications", Software Maintenance and Reengineering, 2003. Proceedings. Seventh European Conference on. 2003, pp. 379-386.*
Aversano et al. "Web site reuse: cloning and adapting" Web Site Evolution, 2001. Proceedings. 3rd International Workshop on. 2001, pp. 107-111.*
United States Office Action, U.S. Appl. No. 11/684,555, Aug. 20, 2010, four pages.

* cited by examiner

*Primary Examiner* — Thomas Pham
(74) *Attorney, Agent, or Firm* — Fenwick & West LLP

(57) ABSTRACT

A user accessing a first web application can request to clone that application to form a second web application, where the first web application may be owned by another user. The cloning operation involves copying at least part of a directory for the first web application to a new directory for the second web application. For example, non-private content types, queries, and/or hard-coded images and strings can be copied from the parent directory to the clone directory. The clone web application is then rendered in accordance with the content in its directory.

25 Claims, 10 Drawing Sheets

WEB APPLICATION CLONING

CROSS-REFERENCE TO RELATED APPLICATIONS

The present application claims priority, under 35 U.S.C. § 119, of U.S. Provisional Patent Application No. 60/828,062, filed on Oct. 3, 2006 and entitled "Web Application Cloning," the entirety of which is hereby incorporated by reference. Further, the present application contains subject matter that may be related to the subject in one or more of the following commonly owned applications: U.S. patent application Ser. No. 11/134,250, filed on May 19, 2005 and entitled "Hosted Application Server"; U.S. patent application Ser. No. 11/141,983, filed on May 31, 2005 and entitled "Content Access and Navigation"; U.S. patent application Ser. No. 11/195,378, filed on Aug. 2, 2005 and entitled "Shared Data Model"; U.S. patent application Ser. No. 11/195,349, filed on Aug. 2, 2005 and entitled "Interacting with a Shared Data Model"; and U.S. patent application Ser. No. 11/213,309, filed on Aug. 26, 2005 and entitled "Content Selection", each of which are hereby incorporated by reference.

BACKGROUND

In general, a computer application allows a user to employ the capabilities of a computer to perform a task. Common computer applications include those used for, for example, word processing, e-mail, and browsing the Internet. Developers of such computer applications typically aim to deliver optimized applications with a robust set of features or a set of features tailored to a particular user base.

Computer applications can be delivered to a user in a variety of ways. For example, a computer application may be offered as part of "off-the-shelf" packaged software, where the application executes entirely on a user's computer; in some cases, the application communicates with remotely located data sources or applications. Alternatively, an application can execute on a remote host computer, and provide results to a user's computer. In this client-server model, the host typically maintains a distinct "session" for each client, and uses at least some data that is likewise specific to the client. Moreover, a computer application may be downloaded from the Internet. Also, various Internet entities provide applications that users can use. Web sites are known to offer, for example, mapping, restaurant review, Internet searching, photo sharing, news, stock market, weather, and social networking services. Such web applications provide a fixed set of features to users, who can use them to store and share data. Thus, many social networking sites allow users to store data, such as photographs, music, and files, and have others access that data. What cannot be done, however, is that the users can themselves modify the underlying applications that manage the data. Instead, these applications are designed with specific functionality (e.g., responding to database requests) and cannot be modified, except perhaps by system or web site administrators.

Creating a computer application, such as any of the ones described above, typically requires writing potentially hundreds to millions of lines of code. Such "programming" requires a certain level of proficiency and expertise with the programming language(s) used to code. Moreover, the developer generally has to have a good understanding of how computer systems work and code structure in order to ensure that their applications can run on particular platforms and at desired performance levels. At best, a typical user is able to enable or disable various predefined functions of an application. Further, most applications are provided to users in object code form, and thus cannot be easily modified at the programming code level to further extend their functionality. Even for applications that are provided in source code form, the user must have sophisticated computer programming skills in order to modify the application functionality. Accordingly, it would be beneficial to provide a user wishing to create his/her own application with the ability to do so without requiring the user to code the entirety of the application and/or to have a strong understanding of the code needed for executing the application.

SUMMARY

The present invention affords users to create and modify their own web applications by cloning applications created by others. In general, embodiments of the present invention relate to a technique for allowing users to create and build their own web applications. Particularly, in one or more embodiments of the present invention, a user may create his/her own web application by copying, or "cloning," all or part of another user's web application In one aspect, a computer-implemented method of creating a web application includes receiving a request from a user to clone a first web application. In response to the request, the method further includes copying at least part of the first web application to a second web application, associating the user as an owner of the second web application, and rendering the second web application.

Further, a system in accordance with embodiments of the present invention includes an application store that is arranged to store a plurality of web applications, where a first web application owned by a first user is accessible to a second user. The system further includes a core component operatively connected to the application store and arranged to receive a request from the second user to clone the first web application. The application store is further arranged to, in response to the request, create a second web application based on the first web application, where the second web application is owned by the second user.

A computer-readable medium having instructions stored therein includes instructions to (i) copy content of a first directory for a first web application in response to receiving a request from a user to clone the first web application, (ii) create a second directory with the copied content, where the second directory is for a second web application, and where the user is designated as an owner of the second web application, and (iii) render the second web application based on content in the second directory.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a technique for allowing users to create and build their own web applications. As used herein, a "web application" is a computer application made available on a network by a user so as to allow one or more other users on the network to use, or at least view, that web application. Thus, in one sense, such web applications may be thought of as "social" web applications. Particularly, in one or more embodiments of the present invention, a user may create his/her own web application by copying, or "cloning," all or part of another user's web application.

Figure 1:
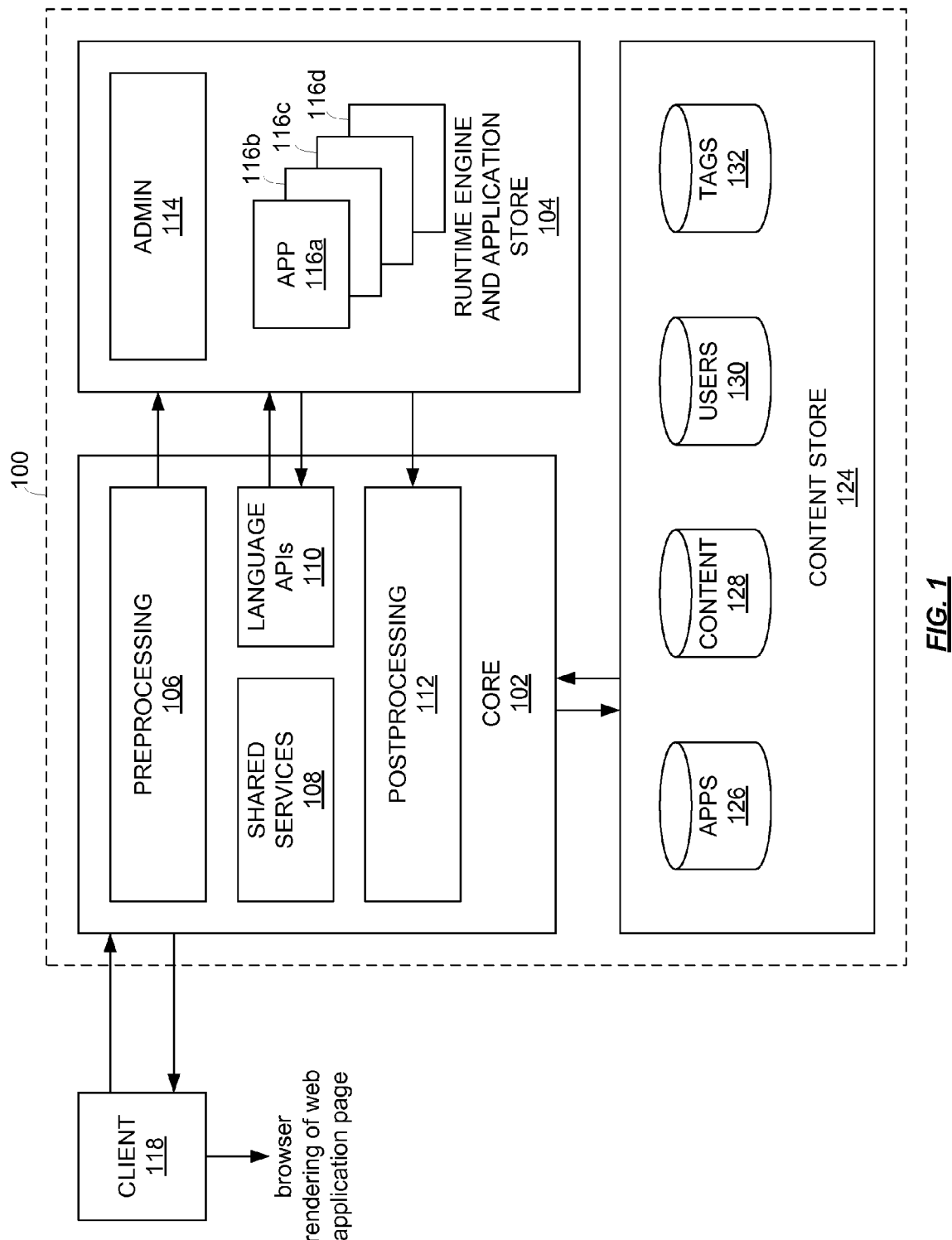
FIG. 1 shows an architecture for supporting web applications in accordance with an embodiment of the present invention.

FIG. 1 shows an architecture 100 for supporting web applications in accordance with an embodiment of the present invention. A further description of embodiments of architecture 100 is provided in U.S. patent application Ser. No. 11/134,250, referenced above as being incorporated herein.

The architecture 100 is accessible by a client 118 via a network (not shown), such as the Internet. Further, architecture 100 may alternatively or additionally be accessible via other one or more other networks. While only a single client 118 is shown, it is understood that in practice there may be numerous clients 118 in communication with the architecture 100. For example, architecture 100 may be accessible via a local area network (LAN) (such as a network maintained and owned by a particular organization (e.g., school, company)), a wide area network (WAN), and/or a mobile network, or any combination thereof. A client 118 uses a web browser (not shown) to access the architecture 100 and web applications contained therein.

Architecture 100 is shown as having a core 102 and a runtime engine and application store 104, each of which has one or more modules. As used herein, a "module" is any program, logic, and/or functionality that is implemented in software and/or hardware or a combination thereof. The core 102 includes a preprocessing module 106 that analyzes requests from the client 118. A request is initiated, for example, by a user (at client 118) entering a web page address (i.e., a uniform resource locator (URL)) associated with a web application hosted by architecture 100. A request may also be generated by the user selecting a link (via, for example, a mouse click) on a web page that references a web application hosted by architecture 100.

In general, the preprocessing module 106 authenticates requests from the client 118. Such authentication may involve authenticating a user (by, for example, verifying a username and password), determining privileges associated with that user (based on, for example, whether the user subscribes to premium services), adding information (e.g., tokens) to an incoming request, and/or performing one or more security measures (e.g., recording an internet protocol (IP) address of the client 118).

Upon authenticating a particular request, the preprocessing module 106 passes the request to the runtime engine and application store 104 via one or more language application program interfaces (APIs) 110. The language API 110 converts the programming language of a request passed from the preprocessing module 106 to a programming language recognizable by a web application referenced by the request.

Web applications 116a, 116b, 116c, 116d are stored in runtime engine and application store 104. Each web application 116a, 116b, 116c, 116d has an owner (e.g., a particular user), and as such, the runtime engine and application store 104 may store web applications for a plurality of users, each user being able to access at least their web applications stored in the runtime engine and application store 104. In most cases, each owner makes his or her web applications 116a, 116b, 116c, 116d available to be viewed and used by others. This sharing of web applications is one aspect of what makes them "social web applications."

Further, the runtime engine and application store 104 may support web applications in one or more of various programming languages. For example, the runtime engine and application store 104 may have sub-stores (not shown) supporting web applications in any one or more of the PHP, JavaScript, Ruby, Perl, and Python programming languages.

In general, an incoming request to the runtime engine and application store 104 causes execution of code in the web application 116a, 116b, 116c, 116d referenced by the request. The execution may, for example, directly call up particular web services or make callbacks to core 102. Callbacks to core 102 may request a service from a shared services module 108. In general, the shared services module 108 provides services to users for use in their web applications. More particularly, for example, the shared services module 108 may provide services for messaging, user registration, tagging, searching, account management, navigation, and/or advertising.

Further, the shared services module 108 may make calls to a content store 124. The content store 124 is a common structure in which data can be stored, shared, and retrieved by multiple web applications 116a, 116b, 116c, 116d. In other words, the content store 124 includes a shared set of data that may be accessed and modified by multiple users or web applications 116a, 116b, 116c, 116d. Objects in the content store 124 are contributed by architecture 100 itself and/or by users of architecture 100. As shown in FIG. 1, the content store 124 includes one or more data stores 126, 128, 130, 132. Particularly, the content store 124 includes an apps data store 126, a content data store 128, a users data store 130, and a tags data store 132. A further description of embodiments of the content store 124 is provided in U.S. patent application Ser. No. 11/195,378, referenced above as being incorporated herein.

As instances of execution are completed in the runtime engine and application store 104, the runtime engine and application store 104 outputs to a post-processing module 112 in core 102. The post-processing module 112 takes the output from the runtime engine and application store 104 and builds a web page that can be delivered to and displayed at the client 118.

Figure 2:
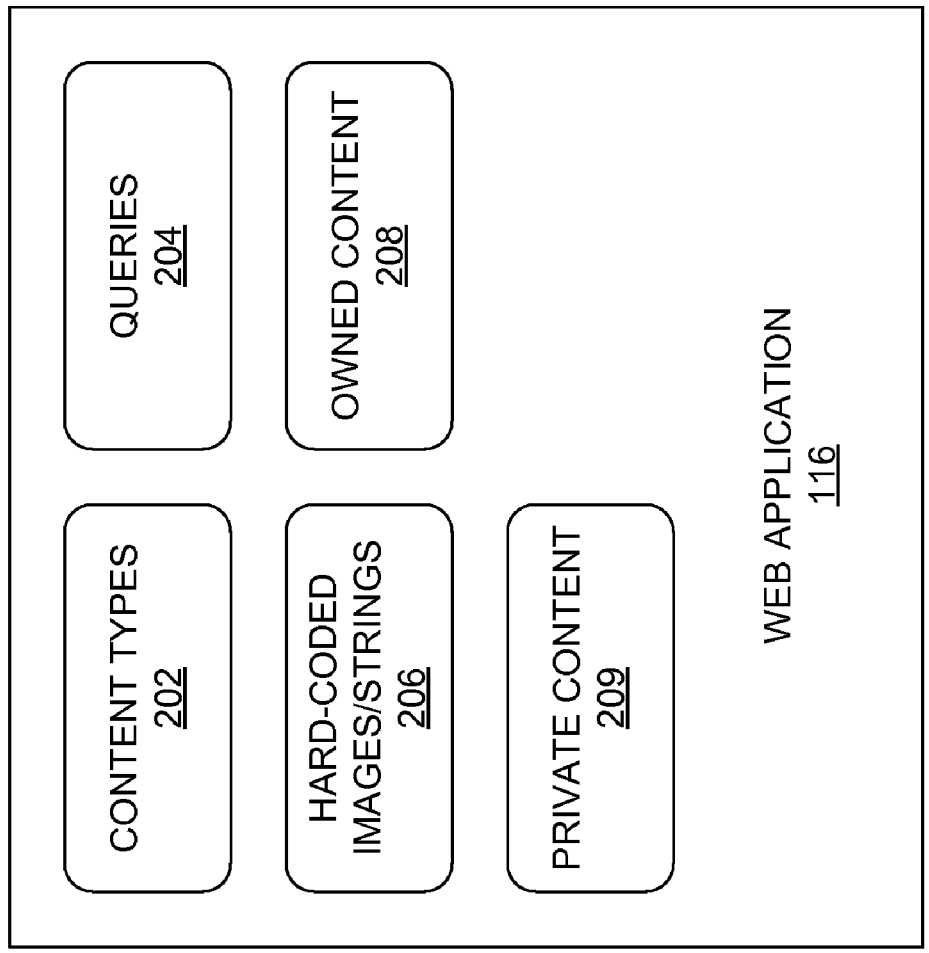
FIG. 2 shows a structure of a web application in accordance with an embodiment of the present invention.

As described above with reference to FIG. 1, architecture 100 hosts multiple web applications 116a, 116b, 116c, 116d that may be accessed by multiple users. FIG. 2 shows a general structure of a web application 116. The web application 116 is made to work via the use of content types 202, queries 204, hard-coded images and strings 206, owned content 208, and/or any private content 209. Content types 202 refer to types of content referenced in the code of the web application 200. For example, a content type may be a book, an image (e.g., JPEG, PNG, BMP), a file (e.g., text document, PDF, code), audio, video, and so forth.

Queries 204 refer to calls for data made in the code of the web application 116. For example, a query may refer to a call for data from a particular web service or via core 102.

The web application 116 also includes hard-coded images and strings. These are images and text that are embedded within the code of the web application 116, and that will be displayed in the user interface of the application when it is rendered for use. Hard-coded images and strings are generally used for configuring the user interface of the application, such as background images and text describing features or portions of the application, labels for links, and so forth. For example, a line in the code may include the string "My Favorite App", which is then displayed when the web application 116 is rendered.

Further, the web application 116 includes owned content 208, that is content that is associated with the web application. Such content may be said to belong to the web application 116. In general, the owned content 208 constitutes the data records that are managed and accessed by the web application. Owned content 208 includes content that is included in the application when it is created, as well as content contributed to the web application 116 afterwards. Such content may be contributed by the owner or other users of the web application 116. Further, this content may be disparate or at least partially common with data stored in the content store 124. For example, in a "Bookshelf" web application, the owned content would be records pertaining to books, such as titles, authors, dates, ISBN numbers, keywords, and the like. In a restaurant review web application, the owned content would be records pertaining to restaurants, such as name, location, food type, cost, comments, rating, and so forth.

A web application 116 may include private content 209 in conjunction with, or instead of, owned content. Such private content 209 may include any content that has been made private by an owner of the web application 200. For example, certain images, strings, logos, and trademarks may be marked private.

Users can create web applications in various ways. In one way, for example, a user can create a web application (such as those described above with reference to FIGS. 1 and 2) "from scratch." In other words, a user may create a web application by providing all of the code necessary to run her web application. However, in practice, many users will not have the knowledge, ability, and/or time to code an entire functional web application. The present invention overcomes this problem by allowing a user may create a web application by copying, or "cloning," part or all of another user's web application. This capability is further described with reference to FIGS. 3-10.

Figure 3:
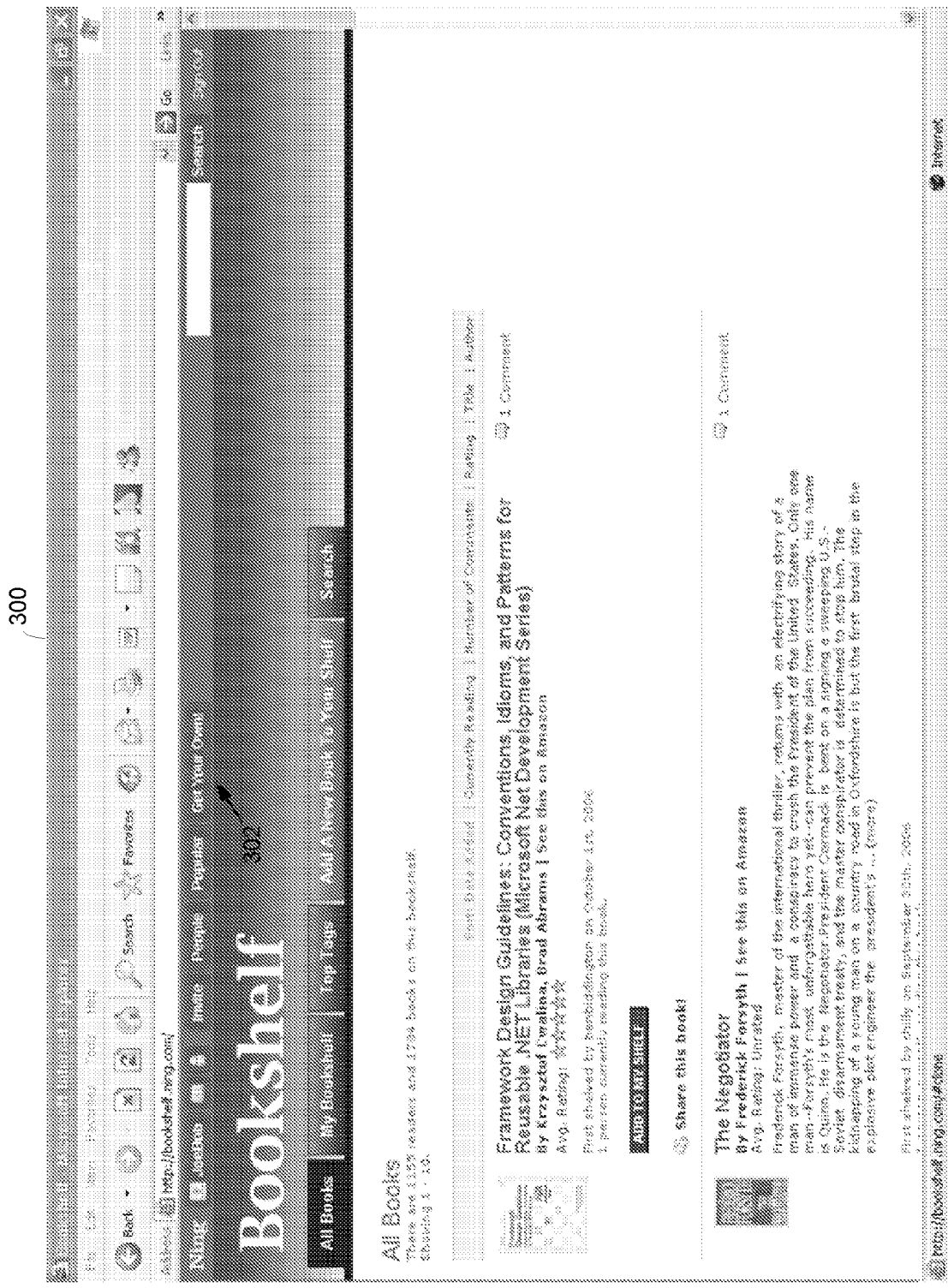
FIG. 3 shows a screenshot of a web application in accordance with an embodiment of the present invention.

FIG. 3 shows a screenshot (or user interface) 300 of a web application 116 in accordance with an embodiment of the present invention. Particularly, the screenshot 300 shows a web page for a "Bookshelf" web application. Even more particularly, the screenshot 300 shows the "Bookshelf" web application as it is being viewed by a current user "JoeBob" (as noted in the top left of the screenshot 300). User JobBob may have accessed the "Bookshelf" web application by pointing his Internet browser to the URL "http://bookshelf.ning.com" as shown in the screenshot 300. User JoeBob can peruse the "Bookshelf" web application to see the books contained therein even though this particular web application is owned by another user. The actual owner may prevent other users such as JoeBob from viewing the "Bookshelf" web application by making it private or defining a group of authorized users.

Further, as shown in the screenshot 300, a "Get Your Own!" link 302 is provided. Selection of this link 302 initiates the process of cloning this web application. Should user JoeBob wish to create his own "Bookshelf" web application, then he can select the "Get Your Own!" link 302. The owner of the "Bookshelf" web application shown in the screenshot 300 may choose to prevent others from being able to clone their web application, in which case the "Get Your Own!" cloning option would not appear to the user. Still further, it is noted that the "Get Your Own!" language is purely for illustration—the link to initiate the cloning process may have any suitable label, for example, "Clone Me!" or "I Want this App!".

Figure 4:
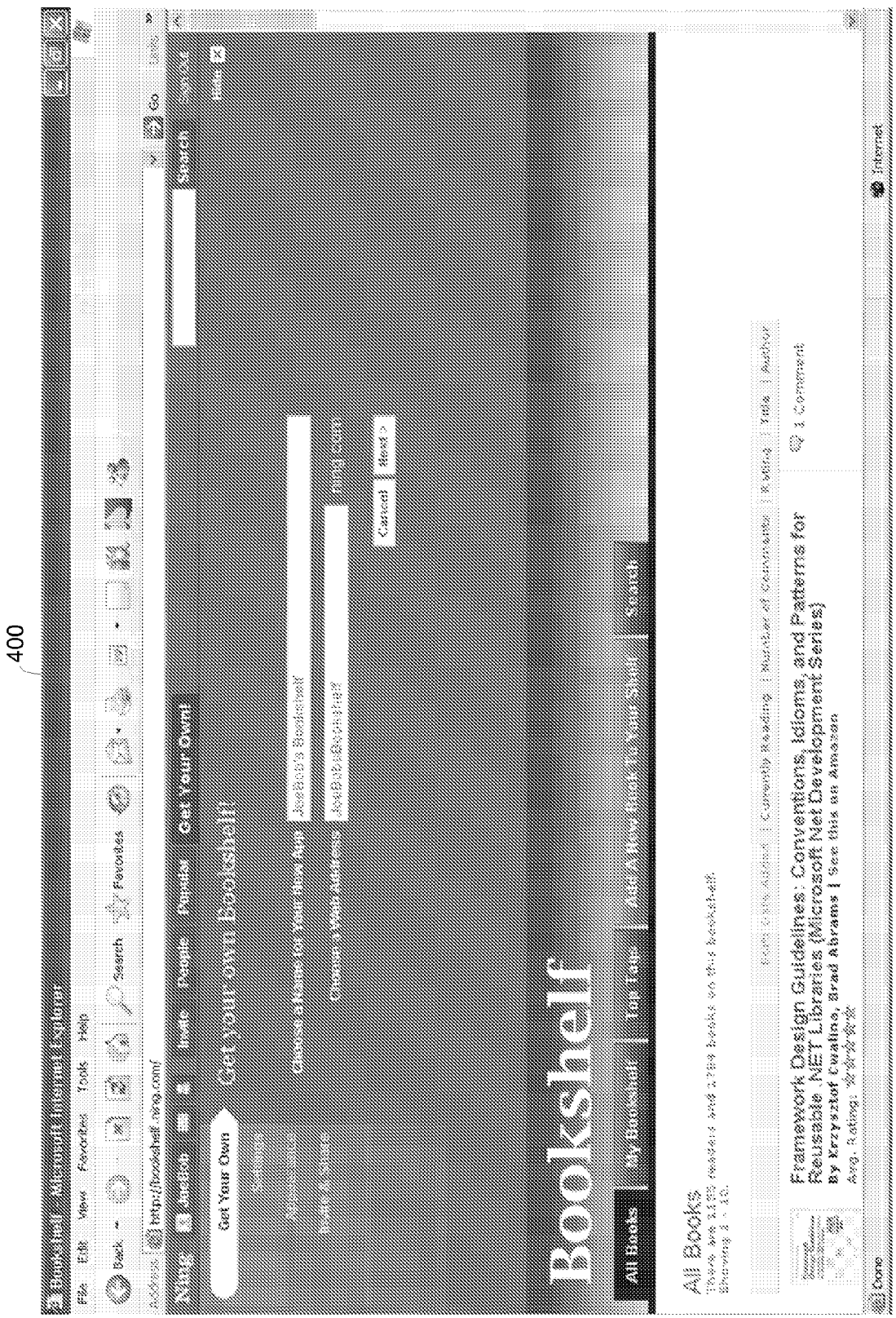
FIG. 4 shows a screenshot of a web application in accordance with an embodiment of the present invention.

Now referring to FIG. 4, it shows a page of the "Bookshelf" web application upon user JoeBob's selection of the "Get Your Own!" cloning option. When the "Get Your Own!" cloning option is selected, user JoeBob is prompted to enter a name for his "Bookshelf" web application and a URL for this application. As shown in the screenshot 400, a default name for the new "Bookshelf" web application may be constructed by simply making the user's name possessive of the name of the web application (e.g., "JoeBob's Bookshelf"). The user may accept this default name or change it to another name; the host system will check to see to make sure that the requested name is not already in use. Further, as shown in the screenshot 400, a default URL for the new "Bookshelf" web application may be formed by simply appending the user's name (in possessive form) to the name of the application (e.g., JoeBobsBookshelf.ning.com). The user may also provide a different URL base name within the host domain; the host system will verify that this URL is available as well, and if not, prompt the user for a different one. However, it is noted that the default settings may be different than that shown in the screenshot 400. For example, a default name may be in the form of "Clone of [name of web application]".

Once user JoeBob has selected the name and URL for his "Bookshelf" web application, he can click the "Next" button shown in the screenshot 400. Selection of this button, invokes the actual cloning operation which results in the underlying creation of user JoeBob's own "Bookshelf" web application. While this cloning operation is occurring, a status message, such as the "Your App is Being Created!" message shown in the screenshot 500 of FIG. 5, may be displayed.

Figure 6:
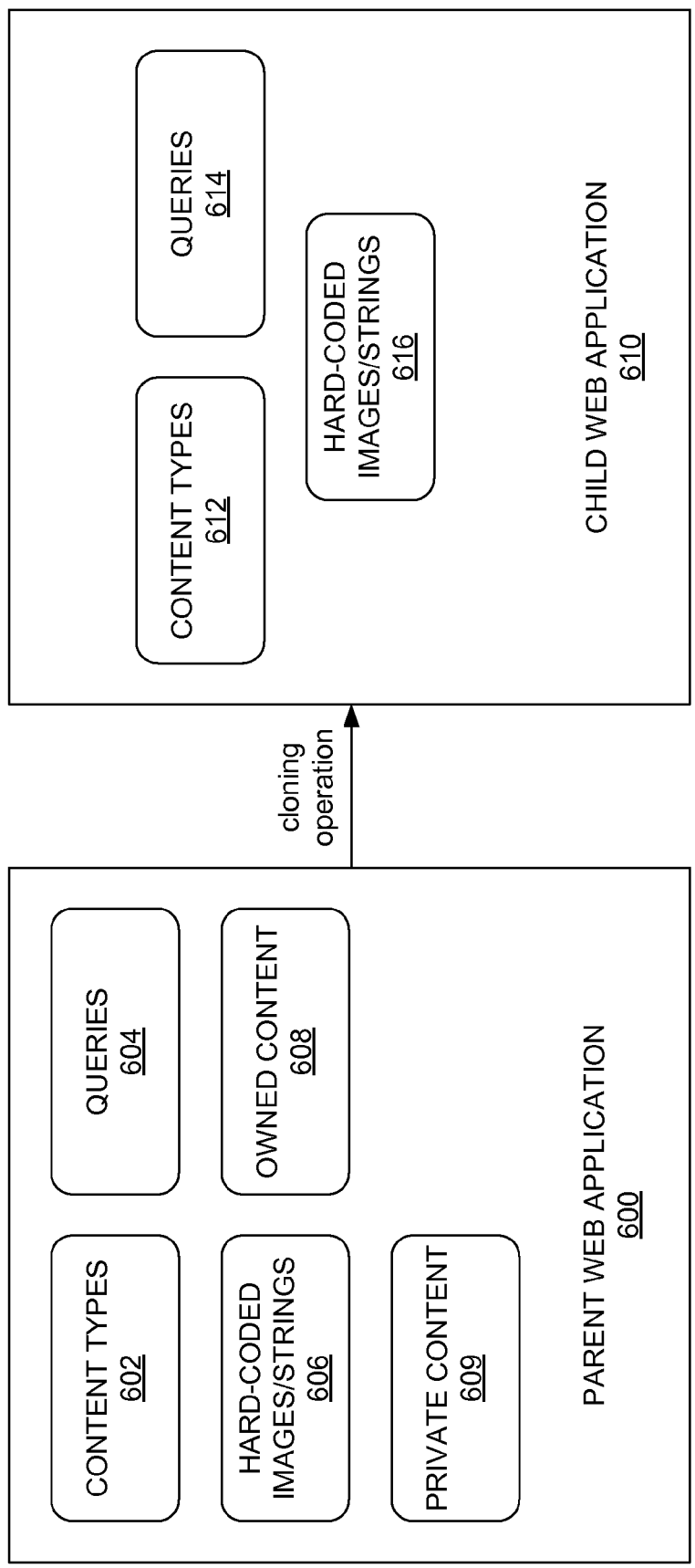
FIG. 6 shows a web application cloning operation in accordance with an embodiment of the present invention.

FIG. 6 schematically shows a cloning operation in accordance with an embodiment of the present invention. In general, in a cloning operation, the directory of a parent web application (i.e., the web application to be cloned) is copied over to a new directory forming a child web application (i.e., the new "clone" web application) less any content owned by or made private in the parent web application.

Referring back to FIG. 1, the directive to perform cloning occurs as a result of the preprocessing module 106 sending a command to an admin module 114 residing in the runtime engine and application store 104. Upon receiving the command, the admin module 114 causes the copying of the directory of the parent web application into a new directory forming the child web application. The child web application, newly created, then resides and is maintained in the runtime engine and application store 104 and is associated with the owner that requested the cloning operation. Moreover, an association between the parent web application and the child web application may be stored.

Referring again to FIG. 6, a parent web application 600 includes content types 602, queries 604, hard-coded images and strings 606, owned content 608, and any private content 609 as described above with reference to FIG. 2. When the cloning operation is invoked, (i) the content types 602 of the parent web application 600 are copied to form the content types 612 to be used by a child web application 610, (ii) the queries 604 used in the parent web application 600 are copied to form the queries 614 that are to be used by the child web application 610, and (iii) the hard-coded images and strings 606 used in the parent web application 600 are copied to form the hard-coded images and strings 616 to be used in the child web application 610.

In one embodiment, the owned content 608 and any private content 609 of the parent web application 600 is not copied over to the child web application 610. Thus, for example, for the "Bookshelf" web application described above with reference to FIGS. 3-5, the books added by the original owner are not copied over to be the books in user JoeBob's "Bookshelf" web application. However, it is noted that if any of owned content 608 is public and the queries 614 copied over to the child web application 610 reference public content, then the child web application 610 may access the same content when first run after cloning.

Further, it is noted that the parent web application 600 (and every web application for that matter) includes a configuration file (e.g., a "config.ini" file) (not shown) that specifies certain attributes or settings of the parent web application 600. When the parent web application 600 is requested to be cloned, its configuration file may not be directly and fully copied over to the child web application 610. Instead, a setup process, described further below with reference to FIGS. 7-9, allows the user to select certain attributes and settings for his/her newly created child web application 610. Moreover, certain attributes and settings (not necessarily part of the configuration file) for the child web application 610 may be set without user prompting. For example, such attributes and settings may include one or more of the following: an owner designation; a creation date; tags; URL mappings; and association with premium services. These may form part of an application table associated with the child web application 610. Moreover, in one or more embodiments, the clone web application may have different privacy or permission settings than the web application from which it was cloned. For example, while a parent web application is "cloneable" or viewable, its clone may be set to not be cloneable or viewable, as decided by the new owner. Such a setting may be invoked, for example, if it becomes desirable to slow down the cloning evolution of a particular type of web application.

Once the child web application 610 has been created (i.e., after the directory of the parent web application 600 has been copied over to the new directory forming the child web application 610), numerous settings options may be made available to the user. For example, returning back to the example involving user JoeBob and the "Bookshelf" web application described above with reference to FIGS. 3-5, upon creation of the user's "Bookshelf" web application, settings options such as those shown in the screenshot 700 of FIG. 7 may be made available.

As shown by the application profile page 700, the user can select what category his newly created "Bookshelf" web application should belong to, so that other users perusing the selected category would come across the user "Bookshelf" web application. Further, user JoeBob can specify tags for his new web application. Still further, for example, user JoeBob may select an image to be associated with his "Bookshelf" web application, where that image may be displayed to other users to indicate the existence of user JoeBob's "Bookshelf" web application.

Figure 5:
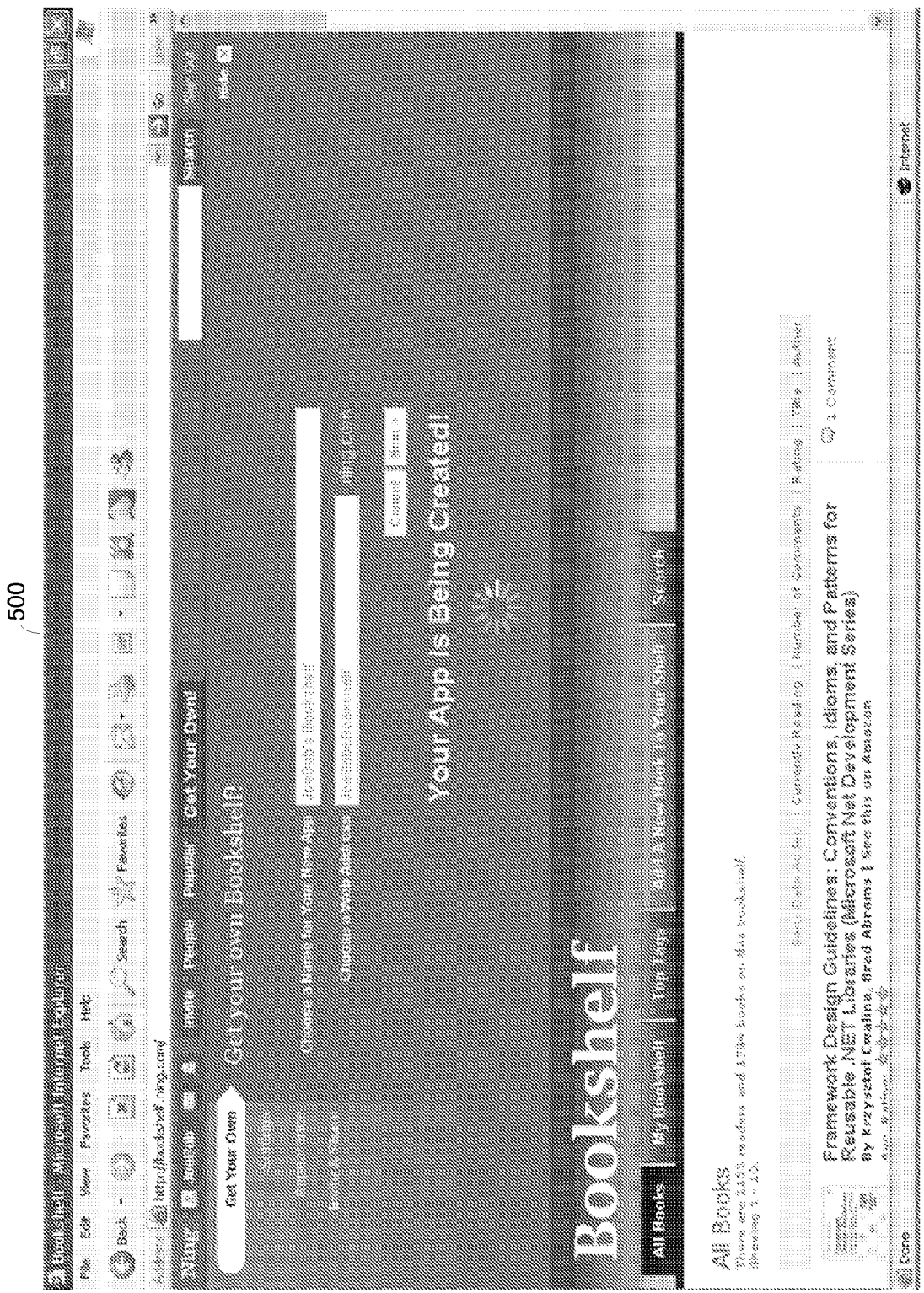
FIG. 5 shows a screenshot of a web application in accordance with an embodiment of the present invention.
Figure 7:
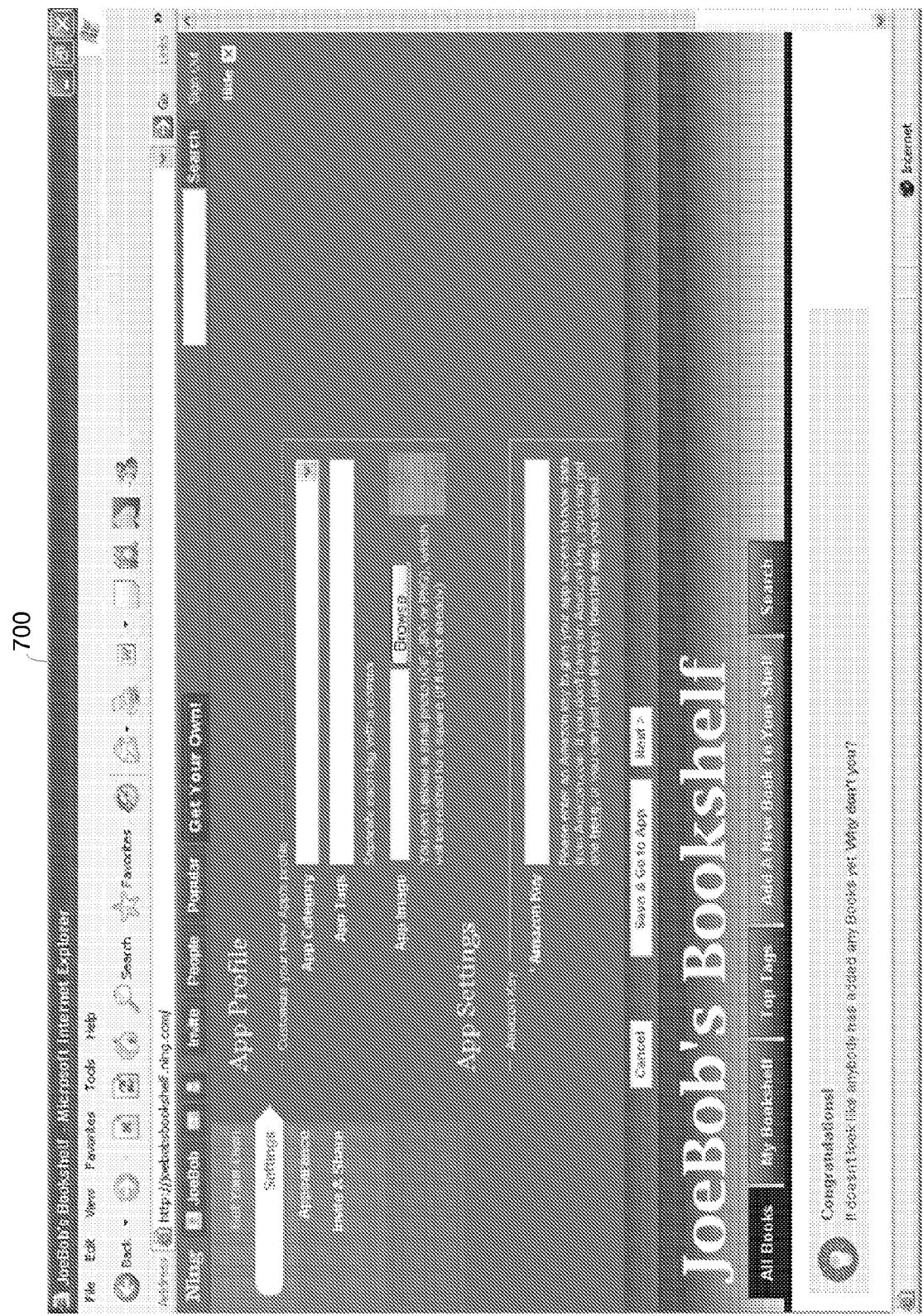
FIG. 7 shows a screenshot of a web application in accordance with an embodiment of the present invention.

Further, it is noted that user JoeBob's new "Bookshelf" web application resides at the URL within the host domain specified in the application creation page 500 of FIG. 5, namely at "http://joebobsbookshelf.ning.com/" (as shown in FIG. 7). Moreover, as shown in FIG. 7, the new web application is entitled "JoeBob's Bookshelf" as specified in the application creation page 500.

Figure 8:
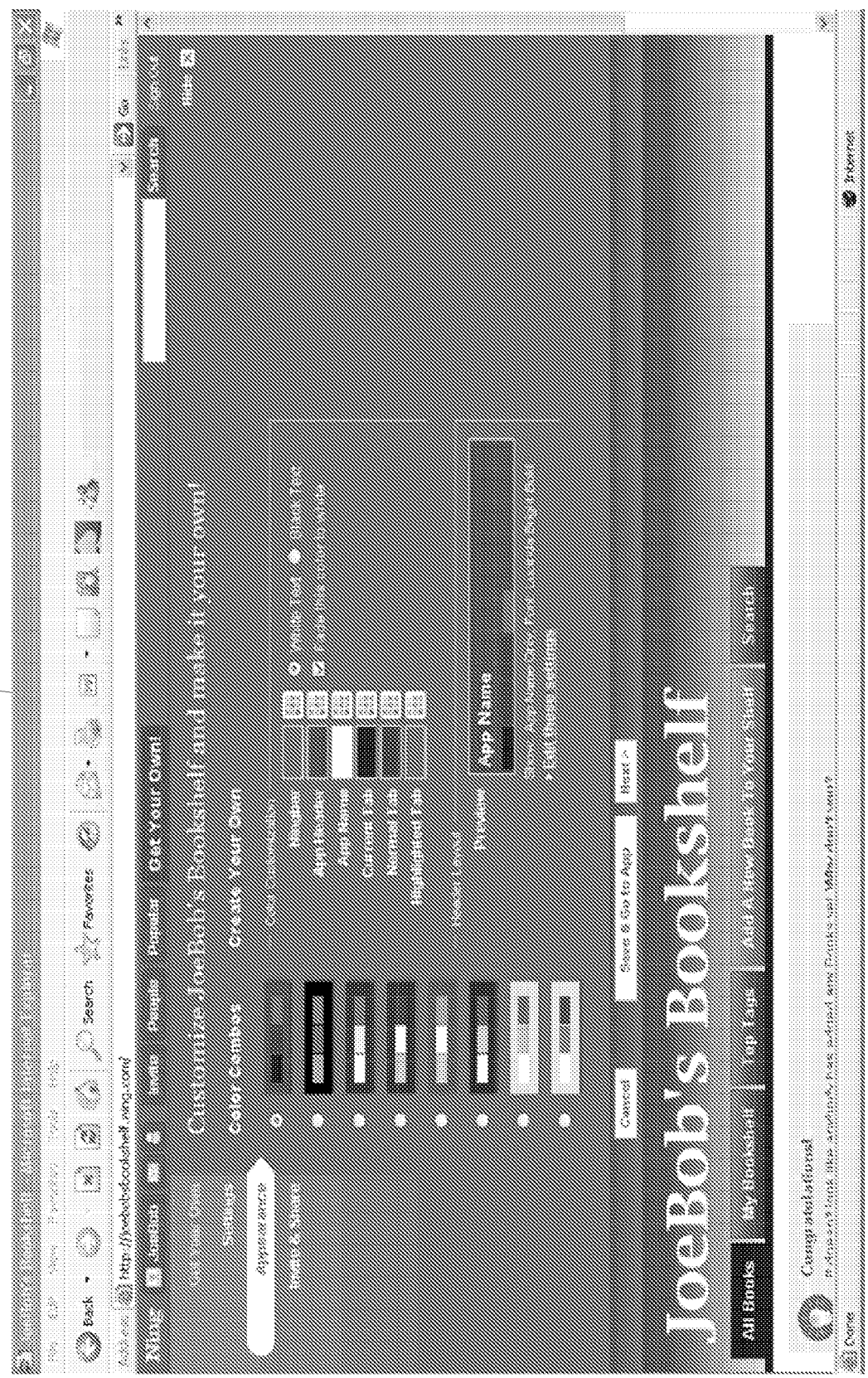
FIG. 8 shows a screenshot of a web application in accordance with an embodiment of the present invention.

In a next setup page 800, of FIG. 8, the user may decide how he wants his "Bookshelf" web application to appear. For example, the user can choose colors and combinations thereof, color effects, text strings, and/or various other "look and feel" features.

Figure 9:
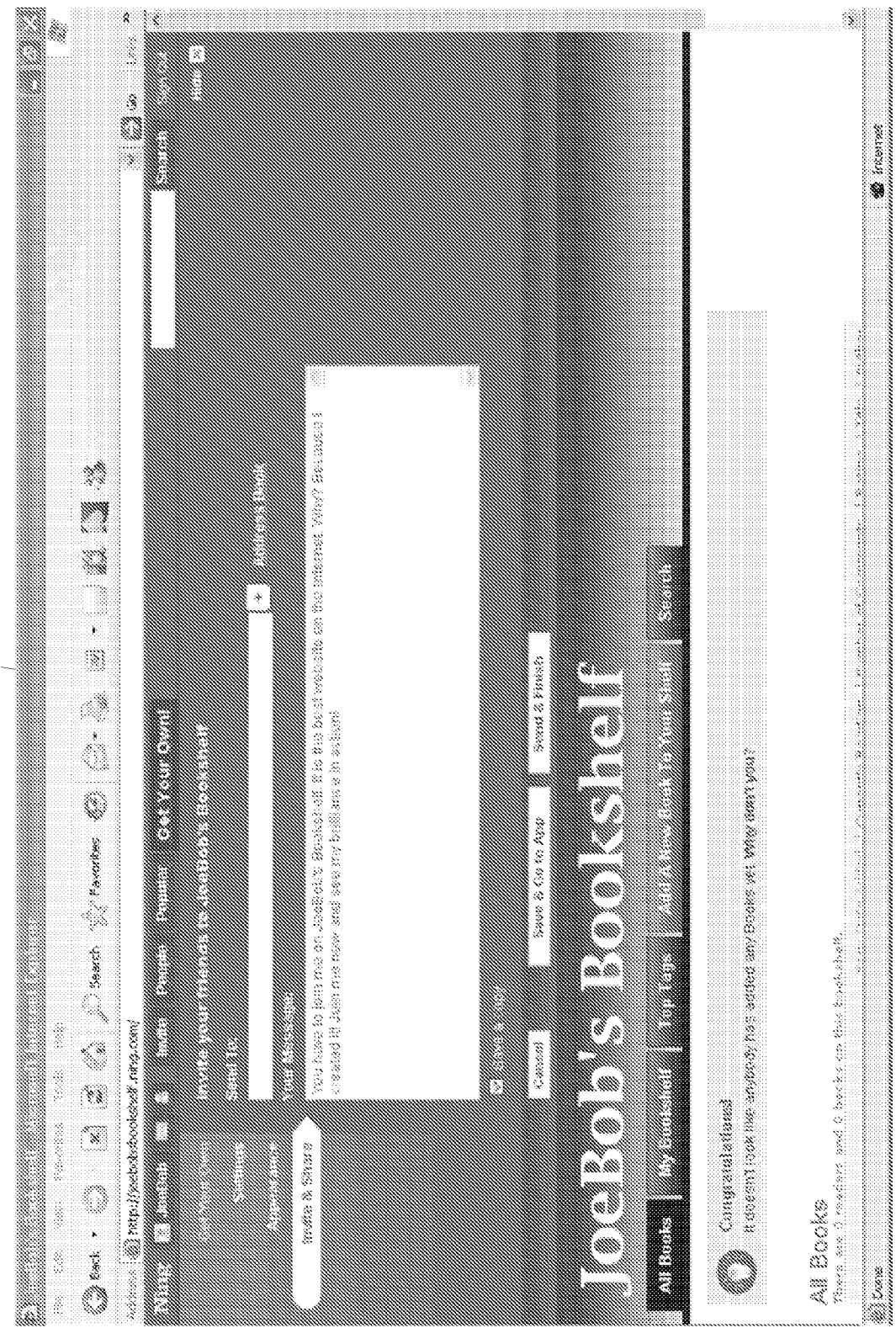
FIG. 9 shows a screenshot of a web application in accordance with an embodiment of the present invention.

FIG. 9 shows an optional setup page 900 that the user can use to invite others to view (and possibly clone) his newly created "Bookshelf" web application. The user may also add an invitation message or modify a default invitation message. Such invitation messages may be sent, for example, via e-mail and/or SMS text messages.

Figure 10:
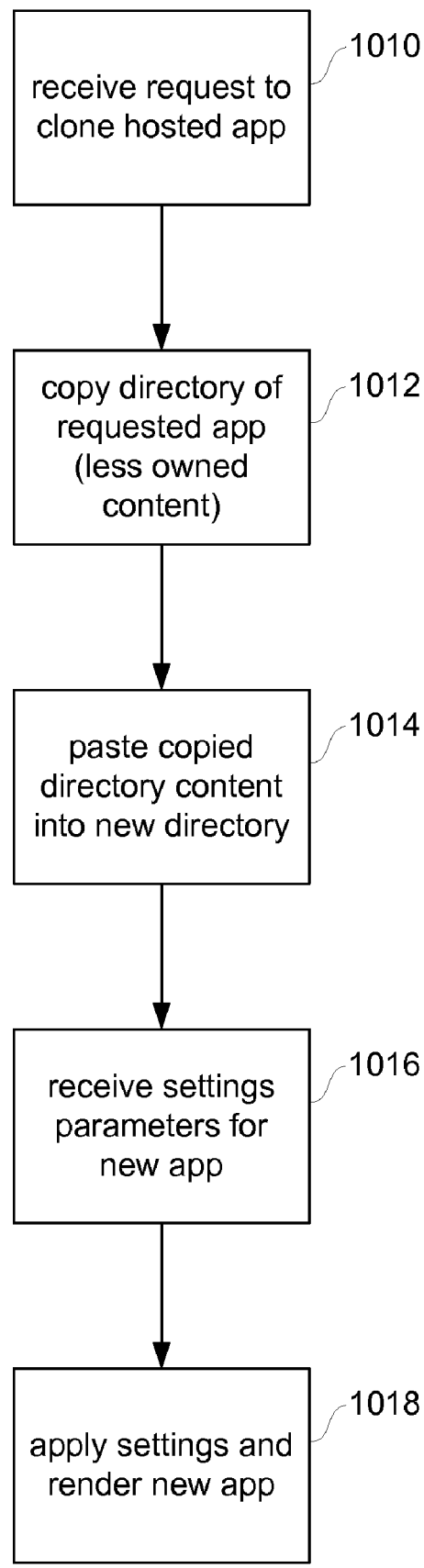
FIG. 10 shows a flow process in accordance with an embodiment of the present invention.

FIG. 10 shows a flow process in accordance with an embodiment of the present invention. Initially, a request is received 1010 to clone a particular web application. This web application may be hosted in an architecture such as that shown in FIG. 1. Thus, in such a manner, the selected web application is one accessible by users other than the owner.

Upon receiving the request to clone the directory of the requested web application is copied 1012 less any owned content. This owned content may represent content that is private to the requested web application. Moreover, certain content, such as images and strings, may be made private so to be prevented from being copied over during a cloning operation.

The copied directory content is pasted 1014 into a new directory representing the clone web application. One or more attributes of the new directory may be dynamically set based on parameters specified in the request 1010 to clone described above.

Further, settings parameters are received 1016 from the user requesting the clone. Such setting parameters may specify, for example, a "look and feel" of the clone web application.

Upon receiving the settings parameters, the settings are applied 1018 and the new clone web application is rendered to the user requesting the clone. It is noted that in one or more embodiments, the new clone web application is "empty" in that it does not contain any of the content owned by its parent web application.

As described above with reference to FIGS. 3-10, a user may clone another user's web application by copying the code in that other user's web application. It is noted that the code of the parent web application may change after a child clone of that web application has been created. Thus, in such cases, a "recloning" operation may be requested in which the clone web application's directory is replaced with the files //all of them?// in the directory of the parent web application.

Such an operation may be invoked without altering content owned by the clone web application; although, in one or more embodiments, a manual or dynamic script may be executed to update the clone web application's content to include attributes associated with new functionality.

Further, a "backup and restore" capability may be provided for allowing a user to roll back the recloning operation and recover the earlier version of the clone web application. Such "backup and restore" may occur automatically whenever a recloning operation is requested or upon selection by a user.

Still further, a user may reclone a web application's grandparent application. This would allow a user who has cloned a web application (parent) that is a child clone of another web application (grandparent) to get the latest version of the grandparent web application in the event that their immediate parent has been deleted or has not inherited the latest version of the web application. For example, if a web application A (the grandparent) is cloned to form a web application B (the parent), and web application B is cloned to form a web application C (the grandchild), then if the code of web application A changes and that of web application B is not recloned to reflect the changes in web application A, web application C may perform a recloning operation directly using web application A.

Additionally, a user may perform a recloning operation on a child clone web application. For example, if web application A is cloned to form web application B, then later, upon changes to web application B, web application A may be recloned using web application B so as to inherit the changes to web application B. In this way, a parent web application can "reverse inherit" functionality or features that have been added to the child application.

Further, a user may perform a recloning operation on a web application that has similar functionality but no cloning association. This allows, for example, one web application to inherit functionality from another web application with similar functionality (e.g., photo sharing) while preserving the first web application's content and URL.

Still further, a user may perform a recloning operation on a subset of another web application. For example, a particular web application may have great photo sharing functionality but poor bookmarking functionality. The user may then reclone only a subset, component, and/or module of that web application so as to inherit certain improvements and functionalities and not others. Further, it is noted that in such cases, multiple web applications may be combinable on a single web page.

Additionally, a user may notify other users of web application recloning or updating activity. For example, e-mails, RSS feeds, flags, and other forms of notification may be used to let users know when there is a new, updated version of a web application. Further, such notifications may be extended to notify an owner of a parent web application if and when a child clone of that web application is updated. Thus, depending on the scope of the change to the child clone web application, the owner of the parent web application may decide whether or not to perform a recloning operation to reverse inherit such functionality Further, a user may merge content of his/her web application with content of another web application. In other words, via such merging, a user who has cloned and modified an earlier version of a web application may obtain a latest version of that web application while preserving changes the user has made to his/her web application.

Still further, a user may choose to compare content of his/her web application with content of another web application. In such a manner, the user may compare content of his/her clone web application with content of the parent web application and manage conflicts among them. The user may thus be able to selectively choose which files should be in a new merged version of his/her clone web application. It is noted that in one or more embodiments, a source code of a plurality of web applications hosted using architecture 100 (FIG. 1) may be viewable by a plurality of users regardless of ownership, thereby, for example, allowing comparison of web applications.

Additionally, a user may disable a cloning functionality for one or more of his/her web applications. In other words, the user can prevent others from cloning his/her web application. It is noted that in cases where cloning is promoted and encouraged, such cloning disablement may only be available to users agreeing to pay a certain fee.

Further, one or more embodiments of the present invention may be associated with virtually any type of computer system, including multiprocessor and multithreaded uniprocessor systems, regardless of the platform being used. For example, a networked computer system includes at least one processor (e.g., a general-purpose processor, a field-programmable gate array (FPGA), an application-specific integrated circuit (ASIC), a graphics processor), associated memory, a storage device (e.g., a hard drive), and numerous other elements and functionalities typical of modern computer systems. The networked computer system may also include input means (e.g., a keyboard, a mouse) and output means (e.g., a monitor). The networked computer system may be connected to a LAN or a wide are network (WAN) via a network interface connection. Those skilled in the art will appreciate that these input and output means may take other forms. Further, those skilled in the art will appreciate that one or more elements of the networked computer system may be remotely located and connected to the other elements over a network. Further, software instructions to perform one or more embodiments of the present invention may be stored on a computer-readable medium such as a compact disc (CD), a digital video disc (DVD), a diskette, a tape, a file, a USB drive, or any other computer-readable storage device.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented method of creating a web application, the method comprising:
   receiving a request from a user to clone a first web application; in response to the request,
   copying at least part of the first web application to a second web application,
   associating the user as an owner of the second web application,
   rendering the second web application; and
   subsequent to the copying:
   receiving additional content not stored by the first web application for storage by the second web application, and storing the additional content in association with the second web application;
   receiving a modification to the first web application that provides the first web application with new functionality;
   receiving a request from the user to update the second web application; and in response to receiving the request to update the second web application, adding the new functionality to the second web application without altering the additional content of the second web application.

2. The computer-implemented method of claim 1, wherein the user is not an owner of the first web application.

3. The computer-implemented method of claim 1, wherein the copying of at least part of the first web application comprises:
copying at least one of a content type, a query, a hard-coded image, and a hard-coded string specified in the first web application.

4. The computer-implemented method of claim 3, wherein content owned by the first web application is not copied.

5. The computer-implemented method of claim 1, further comprising at least one of:
receiving a name for the second web application as specified by the user; and
receiving a web address for the second web application as specified by the user.

6. The computer-implemented method of claim 5, further comprising:
rendering the second web application at the web address.

7. The computer-implemented method of claim 1, further comprising:
receiving a setting parameter specified by the user;
associating the setting parameter with the second web application; and
rendering the second web application in accordance with the setting parameter.

8. The computer-implemented method of claim 1, wherein the first web application has changed since the copying of at least part of the first web application to the second web application.

9. The method of claim 1, further comprising:
receiving a request to roll back the updating; and
responsive to receiving the request to roll back, restoring the second web application to an earlier version of the second web application that was prior to the updating.

10. The method of claim 1, further comprising:
receiving a request from a user to clone the second web application;
copying at least part of the second web application to a third web application;
subsequent to the copying of the at least part of the second web application:
receiving a second modification to the first web application that provides the first web application with second new functionality; and
in response to receiving a request to update the third web application, adding the second new functionality to the third web application, wherein the second web application lacks the second new functionality.

11. The method of claim 1, further comprising, subsequent to receiving the modification to the first web application:
receiving a modification to the second web application that provides the second web application with second new functionality;
in response to receiving a request to update the first web application, adding the second new functionality to the first web application.

12. A system, comprising:
an application store arranged to store a plurality of web applications, wherein a first web application owned by a first user is accessible to a second user; and
a core component operatively connected to the application store and arranged to receive a request from the second user to clone the first web application,
wherein the application store is further arranged to, in response to the request:
create a second web application based on the first web application, wherein the second web application is owned by the second user; and
subsequent to creating the second web application:
receive additional content not stored by the first web application for storage by the second web application, and store the additional content in association with the second web application;
receive a modification to the first web application that provides the first web application with new functionality;
receive a request from the user to update the second web application; and
in response to receiving the request to update the second web application, add the new functionality to the second web application without altering the additional content of the second web application.

13. The system of claim 12, wherein the second user is not an owner of the first web application.

14. The system of claim 12, wherein the application store is further arranged to not copy content owned by the first web application into the directory for the second web application.

15. The system of claim 12, wherein the core component is arranged to render the second web application in accordance with a setting parameter received from the second user.

16. The system of claim 12, wherein the application store is further arranged to associate at least one of an application name and a web address specified by the second user with the second web application.

17. A computer-readable medium having instructions stored therein that are executable by a processor, the instructions comprising instructions to:
copy content of a first directory for a first web application in response to receiving a request from a user to clone the first web application;
create a second directory with the copied content, wherein the second directory is for a second web application, and wherein the user is designated as an owner of the second web application;
render the second web application based on content in the second directory; and
subsequent to the copying:
receive additional content not stored in the first directory of the first web application for storage in the second directory of the second web application, and store the additional content in association with the second web application;
receive a modification to the first web application that provides the first web application with new functionality;
receive a request from the user to update the second web application; and
in response to receiving the request to update the second web application, add the new functionality to the second web application without altering the additional content of the second web application.

18. The computer-readable medium of claim 17, wherein the content of the first directory comprises at least one of a content type, a query, a hard-coded image, and a hard-coded image string.

19. The computer-readable medium of claim 17, wherein the instructions to copy content of the first directory do not copy content owned by the first web application.

20. The computer-readable medium of claim 17, further comprising instructions to:
   render the second web application in accordance with a setting parameter specified by the user.

21. The computer-readable medium of claim 17, further comprising instructions to:
   in response to receiving the request, prompt the user for a name for the second web application.

22. The computer-readable medium of claim 17, further comprising instructions to:
   in response to receiving the request, prompt the user for a web address for accessing the second web application.

23. The computer-readable medium of claim 17, wherein the user is not an owner of the first web application.

24. The computer-readable medium of claim 17, wherein the instructions to update the second web application comprise instructions to:
   rewrite content in the second directory with content in the first directory.

25. The computer-readable medium of claim 17, wherein the instructions to update the second web application comprise instructions to:
   merge content in the second directory with content in the first directory.

* * * * *